United States Patent [19]

Tanaka et al.

[11] Patent Number: 5,077,147

[45] Date of Patent: Dec. 31, 1991

[54] LUMINESCENT SCREEN

[75] Inventors: Satoru Tanaka; Fumio Matsui; Yasushi Murata, all of Saitama, Japan

[73] Assignee: Pioneer Electronic Corporation, Tokyo, Japan

[21] Appl. No.: 480,584

[22] Filed: Feb. 15, 1990

[30] Foreign Application Priority Data

May 31, 1989 [JP] Japan ................................ 1-138205

[51] Int. Cl.[5] ............................ B32B 9/00; G01J 1/58

[52] U.S. Cl. .................................... 428/690; 428/917; 250/483.1; 250/484.1; 250/486.1; 250/487.1

[58] Field of Search ............... 250/483.1, 484.1, 486.1, 250/487.1; 428/690, 917

[56] References Cited

U.S. PATENT DOCUMENTS 4,739,172 4/1988 Obata et al. ...................... 250/487.1

*Primary Examiner*—James J. Seidleck

*Assistant Examiner*—Charles R. Nold

*Attorney, Agent, or Firm*—Wegner, Cantor, Mueller & Player

[57] ABSTRACT

A luminescent screen includes a plurality of columnar luminescent elements made of a transparent material which contains a substance capable of emitting luminescent light in response to stimulating light applied thereto, the columnar luminescent elements having central axes parallel to each other and having adjacent sides held against each other. Emitted luminescent light is prevented from leaking in a direction normal to the longitudinal direction of the columnar luminescent elements, thereby increasing the brightness of the entire luminescent screen. Since the columnar luminescent elements of the luminescent screen are not integrally joined as a continuous unitary structure, any leaking luminescent light from the adjacent luminescent elements or regions is reduced.

8 Claims, 1 Drawing Sheet

LUMINESCENT SCREEN

BACKGROUND OF THE INVENTION

1. Field of the Invention

The present invention relates to a luminescent screen containing a substance capable of emitting light in response to stimulating light applied thereto, 2. Description of the Prior Art There are known luminescent screens which comprise a flat screen plate which contains a substance (a luminescent substance) capable of fluorescence or phosphorescence in response to stimulating light such as ultraviolet radiation, visible light, near-infrared radiation, or the like, the fluorescent substance comprising a piperidinium tetra (benzoyltrifluoroacetone) europium complex, for example. The stimulating light is applied as a circular spot to the screen plate to enable it to emit luminescent light that serves as a pixel, thereby displaying an image. The luminescent screen is used as a display element of an image display system of the back-projection type or front projection type. In the back-projection-type image display system, stimulating light is applied to one side (back surface) of the luminescent screen, which emits luminescent light from the other side (display surface) thereof for the observer to see. In the front-projection-type image display system, stimulating light is applied to one side (display surface) of the luminescent screen, which emits luminescent light from the same side for the viewer to see.

Since the luminescent screen of the back-projection-type image display system comprises a flat screen plate, as shown in FIG. 1 of the accompanying drawings, when stimulating light is applied as a spot to a back surface 20*b* of the luminescent screen 20, luminescent light which is emitted from the luminescent substance is scattered in every direction, including directions toward both surfaces 20*a*, 20*b* of the luminescent screen 20 and directions propagated in the flat screen plate. Therefore, the efficiency with which the applied stimulating light is utilized is low, and the intensity of luminescent light emitted toward the display surface 20*a* of the screen plate is so low that the screen as viewed by the viewer is relatively dark.

SUMMARY OF THE INVENTION

In view of the aforesaid drawbacks of the conventional luminescent screen, it is an object of the present invention to provide a luminescent screen which emits luminescent light of an increased intensity toward a viewer for a greater degree of screen brightness in response to a reference intensity of stimulating light applied to the screen.

According to the present invention, a luminescent screen comprises a plurality of columnar luminescent elements made of a transparent material which contains a substance capable of emitting luminescent light in response to stimulating light applied thereto, the columnar luminescent elements having central axes parallel to each other and having adjacent sides held against each other.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
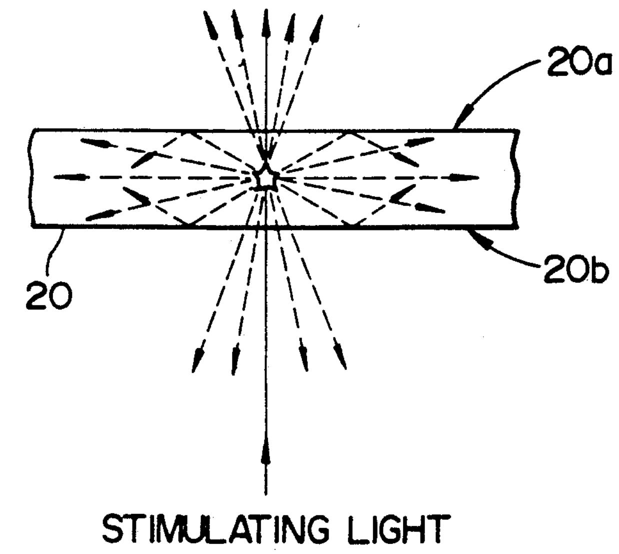
FIG. 1 is a fragmentary cross-sectional view of a conventional luminescent screen.
Figure 2:
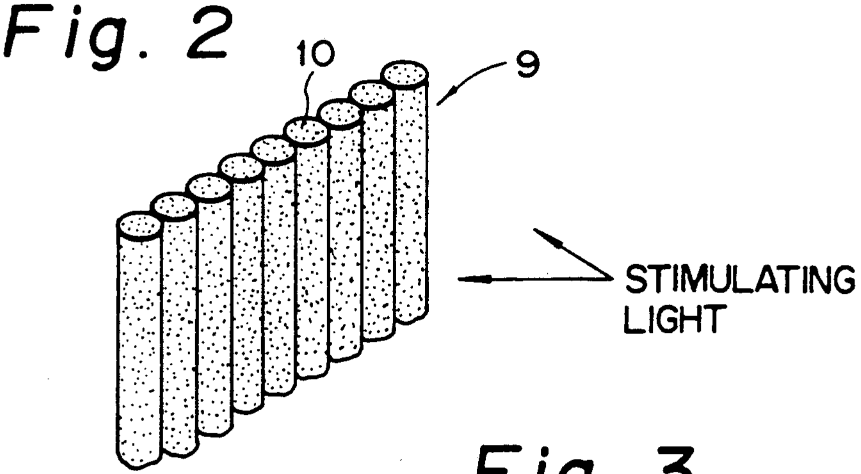
FIG. 2 is a perspective view of a luminescent screen according to an embodiment of the present invention.
Figure 3:
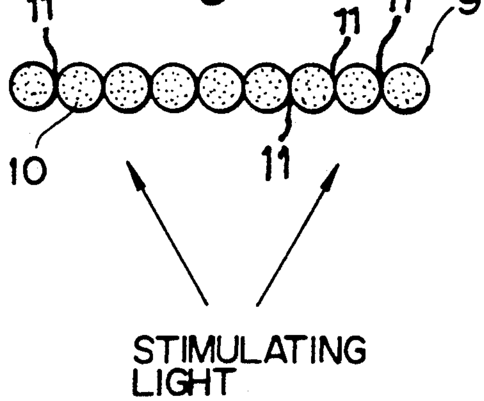
FIG. 3 is a cross-sectional view of the luminescent screen shown in FIG. 2.

FIGS. 2 and 3 show a luminescent screen 9 according to the present invention, which is used in an image display system of either the back-projection type or the front projection type. The luminescent screen comprises a plurality of columnar luminescent elements 10 having adjacent longitudinal sides held against each other and respective central axes extending parallel to each other. Each of the columnar luminescent elements 10 is made of a transparent plastic material with a luminescent substance, such as the substance referred to above, contained and dispersed therein. The columnar luminescent elements 10 are of a circular cross section, but may be of an elliptical cross section.

The columnar luminescent elements 10 are disposed substantially perpendicularly to the direction in which the luminescent screen is scanned by stimulating light. Therefore, any leakage of emitted luminescent light in the scanning direction is reduced.

The columnar luminescent elements 10 may be bonded together by an adhesive layer or thermally fused together with heat at portion 11 as shown in FIG. 3. If an adhesive layer is employed to join the columnar luminescent elements 10, the refractive index of the columnar luminescent elements 10 is preferably higher than that of the adhesive used in order to prevent light from leaking between the columnar elements 10. The adhesive is preferably of an opaque material which may be black in color, for example.

With the present invention, as described above, the luminescent screen comprises a plurality of columnar luminescent elements made of a transparent material which contains a substance capable of emitting luminescent light in response to stimulating light applied thereto, the columnar luminescent elements having central axes parallel to each other and having adjacent sides held against each other. Emitted luminescent light is prevented from leaking in a direction normal to the longitudinal direction o the columnar luminescent elements, thereby increasing the brightness of the entire luminescent screen. Since the columnar luminescent elements of the luminescent screen are not integrally joined as a continuous unitary structure, any leaking luminescent light from the adjacent luminescent elements or regions is reduced.

Although a certain preferred embodiment has been shown and described, it should be understood that many changes and modifications may be made therein without departing from the scope of the appended claims.

What is claimed is:

1. A luminescent screen comprising a plurality of columnar luminescent elements each being made of a mixture of a transparent resin and a luminescent substance dispersed in said transparent resin, said luminescent substance being capable of emitting luminescent light when stimulating light is applied thereto, said columnar luminescent elements being disposed in contact with one another in such a manner that the longitudinal axes of said columnar luminescent elements lie parallel to one another in the screen plane.

2. A luminescent screen according to claim 1, wherein each of said columnar luminescent elements is of a circular transverse cross section.

3. A luminescent screen according to claim 1, wherein each of said columnar luminescent elements are disposed substantially perpendicular to the direction in which the luminescent screen is scanned by the stimulating light.

4. A luminescent screen according to claim 1, wherein each adjacent pair of said columnar luminescent elements is bonded together by an adhesive layer.

5. A luminescent screen according to claim 4, wherein the refractive index of said columnar luminescent element is higher than that of said adhesive layer.

6. A luminescent screen according to claim 4, wherein said adhesive layer is of an opaque material.

7. A luminescent screen according to claim 1, wherein said columnar luminescent elements are thermally fused together with heat.

8. A luminescent screen according to claim 1, wherein each of said columnar luminescent elements is of an elliptical transverse cross section.

* * * * *